(12) United States Patent
Hodges

(10) Patent No.: US 6,332,632 B1
(45) Date of Patent: Dec. 25, 2001

(54) PUSH-IN CLOSET FLANGE

(76) Inventor: B. Eugene Hodges, 761 Palmer Dr., Greenville, MI (US) 48838

( * ) Notice: Subject to any disclaimer, the term of this patent is extended or adjusted under 35 U.S.C. 154(b) by 0 days.

(21) Appl. No.: 09/517,099

(22) Filed: Mar. 2, 2000

Related U.S. Application Data

(63) Continuation-in-part of application No. 08/953,181, filed on Oct. 17, 1997.

(51) Int. Cl.[7] .................. F16L 23/09; F04B 5/48
(52) U.S. Cl. .................. 285/56; 285/344; 285/60
(58) Field of Search .................. 285/344, 56–60

(56) References Cited

U.S. PATENT DOCUMENTS

| | | |
|---|---|---|
| 222,713 | 12/1879 | Lawson . |
| 543,871 * | 8/1895 | Houze .................. 285/344 |
| 978,404 | 12/1910 | Schulte et al. . |
| 2,152,719 | 4/1939 | Williams . |
| 2,264,815 * | 12/1941 | Thomson .................. 285/344 |
| 2,479,837 | 8/1949 | Hollaender . |
| 3,012,252 | 12/1961 | Gaddy . |
| 3,102,741 * | 9/1963 | Lash .................. 285/344 |
| 3,238,538 | 3/1966 | Turner . |
| 4,502,166 | 3/1985 | Brown, Sr. . |
| 4,574,402 | 3/1986 | Brown, Sr. . |
| 4,722,556 | 2/1988 | Todd . |
| 4,993,756 * | 2/1991 | Bechu .................. 285/921 |
| 5,291,619 | 3/1994 | Adorjan . |
| 5,297,817 | 3/1994 | Hodges . |
| 6,070,910 * | 6/2000 | Hodges .................. 285/2 |

FOREIGN PATENT DOCUMENTS

| | | | |
|---|---|---|---|
| 207638 * | 2/1960 | (AT) | .................. 285/344 |
| 5612 * | 9/1932 | (AU) | .................. 285/344 |
| 865885 * | 2/1953 | (DE) | .................. 285/344 |
| 390746 * | 10/1990 | (EP) | .................. 285/344 |
| 2734 * | 8/1873 | (GB) | .................. 285/344 |
| 267950 * | 9/1934 | (IT) | .................. 285/344 |

\* cited by examiner

Primary Examiner—Eric K Nicholson
(74) Attorney, Agent, or Firm—Bullwinkel Partners, Ltd.

(57) ABSTRACT

A closet flange having a shoulder and a body portion extending therefrom, the body portion having a substantially cylindrical upstream portion and a smooth tapered downstream portion, the downstream portion configured to receive an elastic o-ring. The o-ring travels up the tapered portion as the closet flange is inserted into a drain pipe, providing an increasingly tighter seal between the closet flange and the pipe. O-rings of various outer diameters may be provided to accommodate pipes having different internal diameters. The flange is installed without tools by pushing the flange into the end of the pipe until the desired tightness is achieved.

9 Claims, 2 Drawing Sheets

PUSH-IN CLOSET FLANGE

CROSS-REFERENCE TO RELATED APPLICATION

This is a continuation-in-part of co-pending application Ser. No. 08/953,181 filed on Oct. 17, 1997.

FIELD OF THE INVENTION

This patent relates to closet flanges. More particularly, this patent relates to a closet flange which can installed on top of a sewage drain pipe without the use of tools to form a watertight seal, in place of conventional cast iron closet flanges.

DESCRIPTION OF THE RELATED ART

Conventional cast iron closet flanges traditionally have been connected to the top end of a sewage drain pipe by means of a lead and oakum sealed joint. This method entails beating down oakum fiber with a chisel or other implement to seal the joint between the drain pipe and the closet flange, pouring hot lead into the joint, and beating down the cooled lead. This method of installation is difficult, time consuming and costly.

Several easier-to-use replacement closet flanges have been proposed. For example, my U.S. Pat. No. 5,297,817 describes an improved closet flange with telescoping ability that can replace a 4-inch cast iron closet flange and does not require caulking or a lead and oakum seal. Instead, the flange slips inside the drain pipe and is tightened with three bolts. While this flange is useful where telescoping capability is desired, it requires a tool to tighten the bolts.

Adorjan U.S. Pat. No. 5,291,619 describes a closet flange having grooves of varying diameters and a complex-shaped gasket that can be stretched over the flange to fit in a selected groove. The seal is placed within the proper groove before the flange is installed in the drainage pipe. A disadvantage of the Adorjan flange is that it requires trial and error to determine the proper groove in which to place the gasket.

It is therefore a principal object of the present invention to provide an improved closet flange that can replace conventional cast iron closet flanges requiring a lead and oakum sealed joint.

A further object is to provide a closet flange that can be installed without the use of tools.

A still further object is to provide a closet flange having a movable o-ring seal which, as the closet flange is installed, provides a compression fit between the closet flange and the drain pipe.

Another object is to provide a closet flange which can be used with Schedule 30 or Schedule 40 P.V.C. or A.B.S. pipe as well as cast iron pipe.

SUMMARY OF THE INVENTION

The present invention is a closet flange comprising a shoulder portion and a substantially cylindrical body extending from the shoulder portion in a downstream direction. The body has a smooth tapered downstream portion configured to receive an elastic seal or o-ring. The o-ring provides a watertight seal between the closet flange and the pipe. O-rings of various outer diameters may be provided to accommodate pipes having different internal diameters.

The flange is installed without tools by pushing the flange into the end of a drain pipe. When the flange is inserted into the pipe the o-ring travels up the tapered portion of the flange body. The flange is inserted until a good watertight seal is achieved between the o-ring and the pipe. The farther the flange is pushed into the drain pipe, the tighter the watertight seal becomes.

THE DRAWINGS

DETAILED DESCRIPTION OF THE INVENTION

Figure 1:
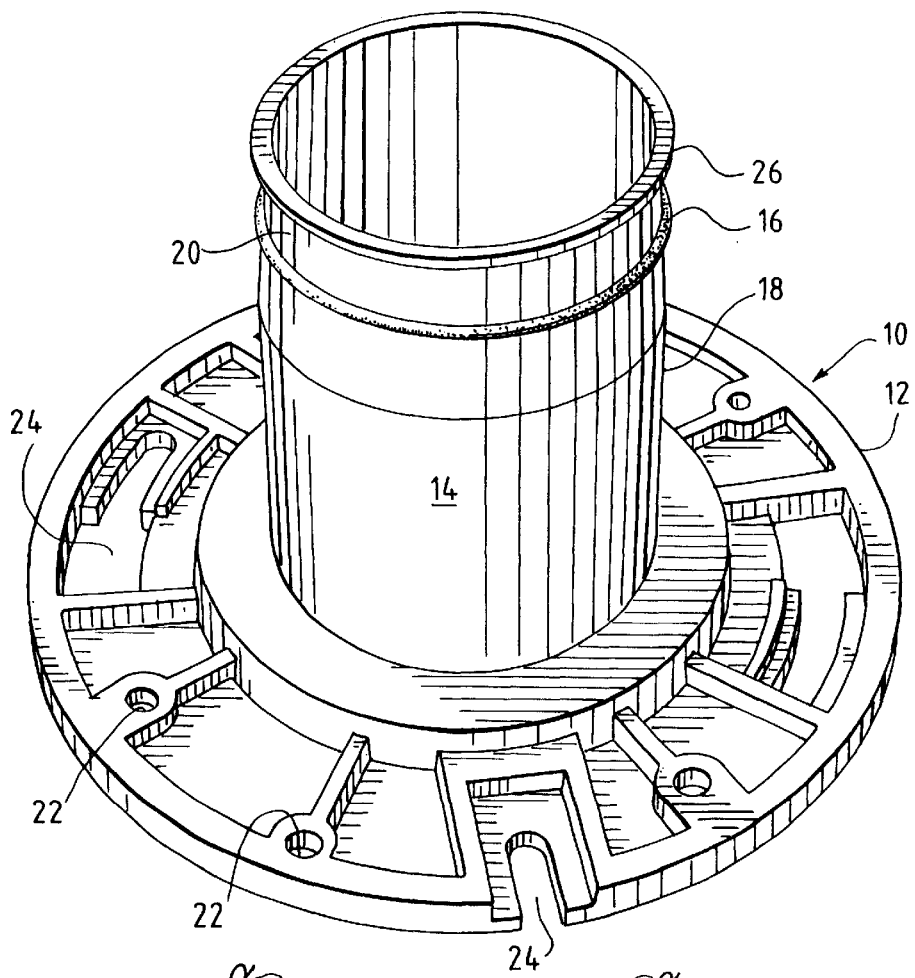
FIG. 1 is a perspective view of the preferred embodiment of the closet flange of the present invention.
Figure 2:
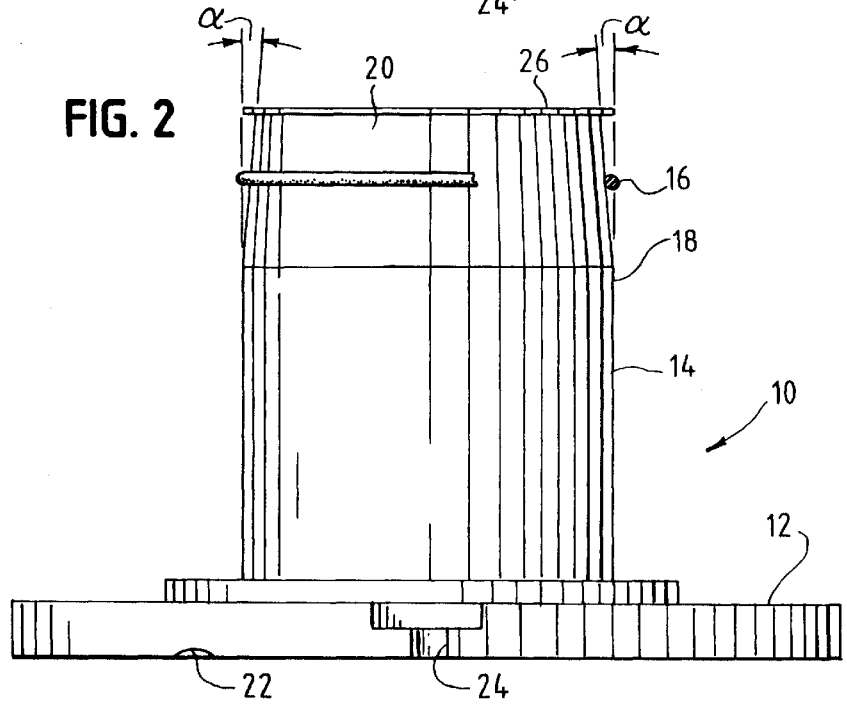
FIG. 2 is a side elevational view of the flange of FIG. 1.

Turning to the drawings, there is shown in FIGS. 1 and 2 the preferred embodiment of the push-in closet flange 10 of the present invention. The push-in closet flange 10 comprises a shoulder portion 12, a body portion 14 and a seal or o-ring 16. The flange 10 is designed to be inserted into the top end of a sewage drain pipe (not shown) to provide a watertight fit, and then receive a toilet or other plumbing fixture (not shown).

The body 14 comprises an upstream portion 18 and a downstream portion 20. The upstream portion is substantially cylindrical and has a constant inside and outside diameter along its length. The downstream portion also has a constant inside diameter along its length, but its outside surface is tapered such that its outside diameter increases in the upstream direction.

The downstream portion 20 is configured to receive an o-ring 16. The o-ring 16 is sufficiently elastic to travel up the tapered outside surface of the downstream portion 20 (that is, travel in the upstream direction toward the shoulder portion 12) as the flange 10 is being inserted into a drain pipe.

The angle of the taper ($\alpha$) of the downstream portion preferably is about 2.5 degrees. In one embodiment intended to be used with three inch ID pipe, the angle of taper is 2.42 degrees. In another embodiment intended to be used with four inch ID pipe, the angle of taper is 2.68 degrees. The downstream portion may also have a radially extending lip 26 which serves to hold the o-ring 16 onto the body 14.

Displaced about the shoulder 12 are a plurality of openings 22 and slots 24 for receiving bolts or the like which are used to secure the flange 10 to the floor and to secure a toilet or other plumbing fixture to the flange 10.

The closet flange 10 is installed without tools by pushing the flange 10 downward into the end of a drain pipe. As the flange 10 is inserted into the pipe, the o-ring 16 is compressed between the flange body 14 and the inner wall of the pipe. Further insertion causes the o-ring 16 to travel up the downstream portion 20 of the flange body 14. As the o-ring 16 travels upward it is further compressed to accommodate the increasing outside diameter of the flange body downstream portion 20. This o-ring compression creates an increasingly tight fit between the flange body 14 and the inner surface of the drain pipe. The o-ring 16 causes some resistance when the flange 10 is pushed into the pipe as the o-ring travels up the flange body 14. Where the resistance is great it may be necessary to grease the o-ring 16.

The flange 10 is inserted until it is flush with the floor. The flange 10 is then secured to the floor and the plumbing fixture installed over the flange 10.

Figure 3:
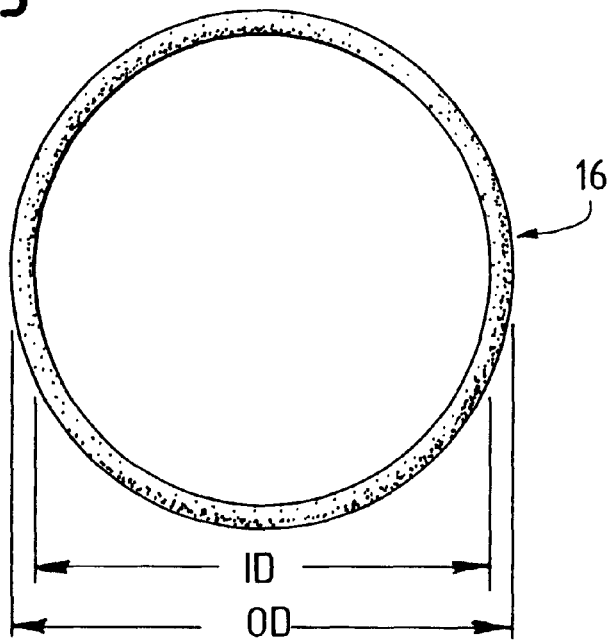
FIG. 3 is a top plan view of a first o-ring embodiment according to the present invention.
Figure 4:
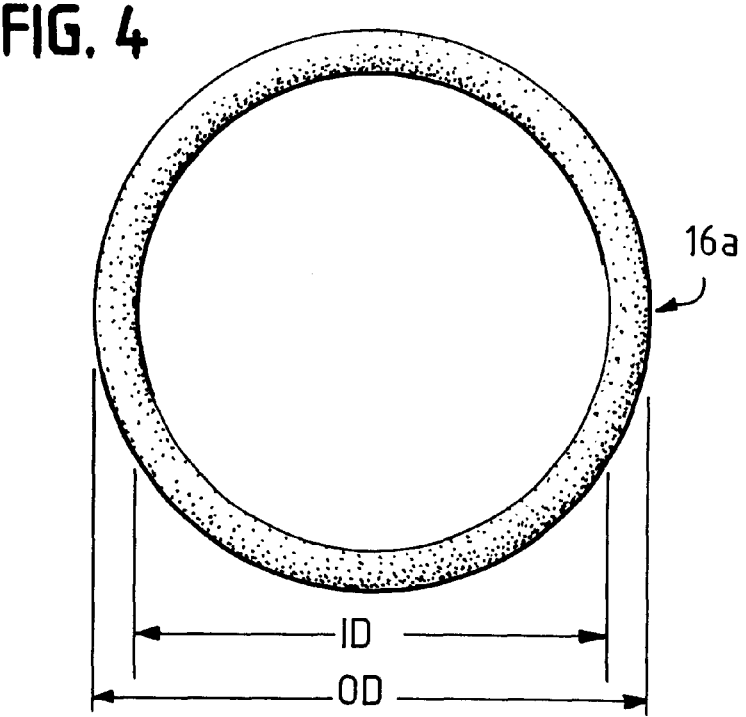
FIG. 4 is a top plan view of a second o-ring embodiment according to the present invention.

Two o-rings 16, 16*a* of different outer diameters are shown in FIG. 3. The f-rings have a simple toroidal-shape instead of the more complex-shapes of gaskets disclosed in other patents. The toroidal shape allows the o-ring to roll upward as the flange 10 is inserted into a drain pipe.

O-rings of various outer diameters are provided to accommodate pipes having different internal diameters. For example, an o-ring having a relatively smaller outer diameter may be used with Schedule 30 plastic pipe, and an o-ring having a relatively larger diameter may be used with Schedule 40 plastic pipe. The o-rings are interchangeable and may be used with the same flange 10. The user selects the proper o-ring depending on the size of the drain pipe and the desired tightness of the fit.

Regardless of which size o-ring is used, it is critical that when the o-ring is placed over the flange body downstream portion 20 by the user, the outer diameter (OD) of the o-ring is greater than the outer diameter of the substantially cylindrical upstream portion 18. Otherwise, the o-ring will not be squeezed between the flange body 14 and the drain pipe and will not form a seal between the two.

The flange 10 may be molded of resilient plastic material such as polyethylene, polypropylene, PVC, nylon, or other suitable material. The o-ring 16 preferably is made from neoprene, although other suitable elastic materials may be used.

The flange 10 can be used with cast iron pipe and, unlike conventional cast iron flanges, may also be used with P.V.C. or A.B.S. pipe.

The flange 10 is designed to be used with pipe having an inside diameter of three inches or greater, such as three inch schedule 40 pipe. Because the flange 10 fits inside the pipe, it effectively reduces the internal diameter of the conduit. Standard plumbing regulations do not allow internal pipe diameters of less than about three inches.

The present invention can be used to replace broken cast iron closet flanges in old buildings where the cost of replacing the flange with a conventional flange, including the cost of cleaning out the old lead joint, is prohibitive. The present invention is also useful in new construction where 4" cast iron, P.V.C. or A.B.S. pipe is used. In new buildings, drains pipes are typically installed first and the concrete floor poured later. When a conventional closet flange is used, it is necessary to chip away the concrete from around the pipe in order to make room for the flange. This method of installing flanges is difficult, time consuming and expensive. The present invention, by contrast, fits inside the existing pipe, eliminating the need to chip concrete from around the pipe after the concrete floor is poured and dried.

Of course, many modifications and other embodiments of the invention will be recognized by one skilled in the art in view of the foregoing teachings. For example, although the figures depict a closet flange having a taper extending only part way up the flange body 14, it is anticipated that the taper can extend farther up the body, even to where the body is connected to the shoulder 12. Therefore, the invention is not to be limited to the exact construction and operation described, and any suitable modifications are to be included within the scope of the claims allowed herein.

I claim as my invention:

1. A closet flange for insertion into a drain pipe, comprising:
    a shoulder portion having a plurality of openings for accommodating means for securing the flange to a floor;
    a body portion extending from the shoulder portion in a downstream direction and defining an axis, said body portion having an upstream portion adjacent the shoulder portion and a downstream portion, said upstream portion being substantially cylindrical and having a constant outer diameter in the axial direction, said downstream portion being tapered such that its outside diameter increases in the upstream direction; and
    a toroidal o-ring disposed about the body downstream portion to provide a compression fit between the flange and the drain pipe, the o-ring being of sufficient elasticity to travel in an upstream direction along the downstream portion as the flange is inserted into the pipe to provide an increasingly tighter fit.

2. The closet flange of claim 1 wherein the downstream portion is tapered at an angle of about 2.5 degrees.

3. The closet flange of claim 1 wherein the o-ring has an outer diameter greater than the outer diameter of the body portion upstream portion.

4. The closet flange of claim 1 further comprising a lip extending radially outward from the end of the downstream portion away from the shoulder, said lip serving to hold the o-ring onto the flange body.

5. A system for connecting a plumbing fixture to drain pipes of varying diameters, the system comprising:
    a closet flange for insertion into a drain pipe, said closet flange comprising a shoulder portion having a plurality of openings for accommodating means for securing the flange to a floor and means for securing a plumbing fixture to the flange, a body portion extending from the shoulder portion in a downstream direction and defining an axis, said body portion having an upstream portion adjacent the shoulder portion and a downstream portion adjacent the upstream portion, said upstream portion being substantially cylindrical and having a constant outer diameter in the axial direction, said downstream portion being tapered such that its outside diameter increases in the upstream direction; and
    a plurality of toroidal o-rings of varying outer diameters to accommodate varying drain pipe inside diameters, said O-rings configured to be disposed about the flange body downstream portion to provide a compression fit between the flange and a drain pipe, the o-rings being of sufficient elasticity to travel in an upstream direction along the downstream portion as the flange is inserted into a drain pipe to provide an increasingly tighter fit.

6. The system of claim 5 wherein the flange body downstream portion is tapered at an angle of about 2.5 degrees.

7. The system of claim 5 wherein the o-ring outer diameters are greater than the outer diameter of the flange body upstream portion.

8. The system of claim 5 wherein the flange further comprises a lip extending radially outward from the end of the downstream portion away from the shoulder portion, said lip serving to hold the o-ring onto the flange body.

9. A closet flange for insertion into a drain pipe, said closet flange comprising:
    a body having an upstream portion and an adjacent downstream portion, said upstream portion having a cylindrical inner wall and a cylindrical outer wall, said downstream portion having a cylindrical inner wall of the same inner diameter as the upstream inner wall, said downstream portion having an outer wall tapered in the downstream direction;
    a shoulder portion extending radially from an end of the upstream portion away from the downstream portion, said shoulder portion having a plurality of openings disposed therein for accommodating means for securing the flange to a floor; and a toroidal o-ring disposed about the downstream portion to provide a compression fit between the flange and the drain pipe, the o-ring being of sufficient elasticity to travel in an upstream direction along the tapered outer wall as the flange is inserted into the pipe to provide an increasingly tighter fit.

* * * * *